United States Patent Office 3,422,769
Patented Jan. 21, 1969

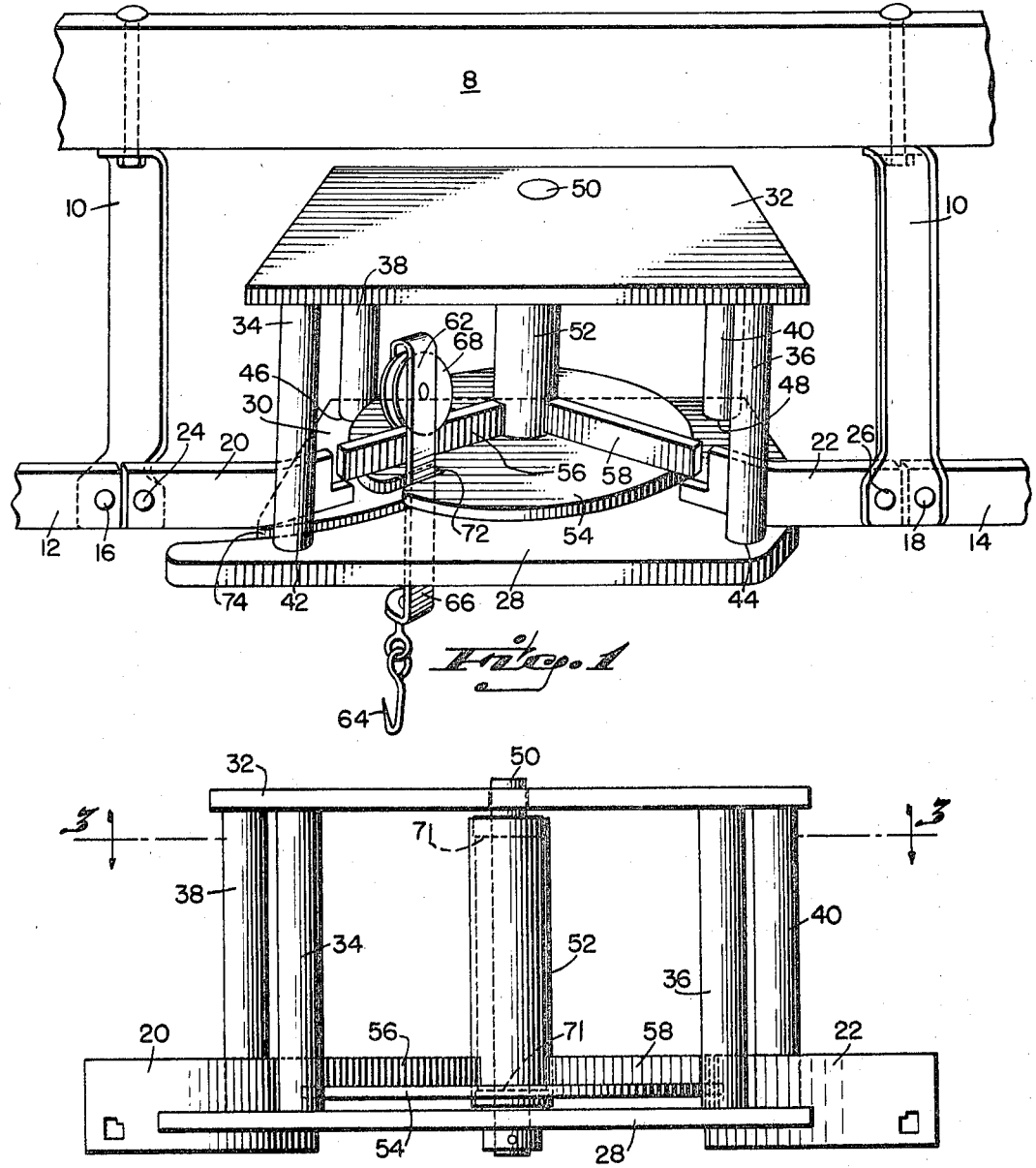

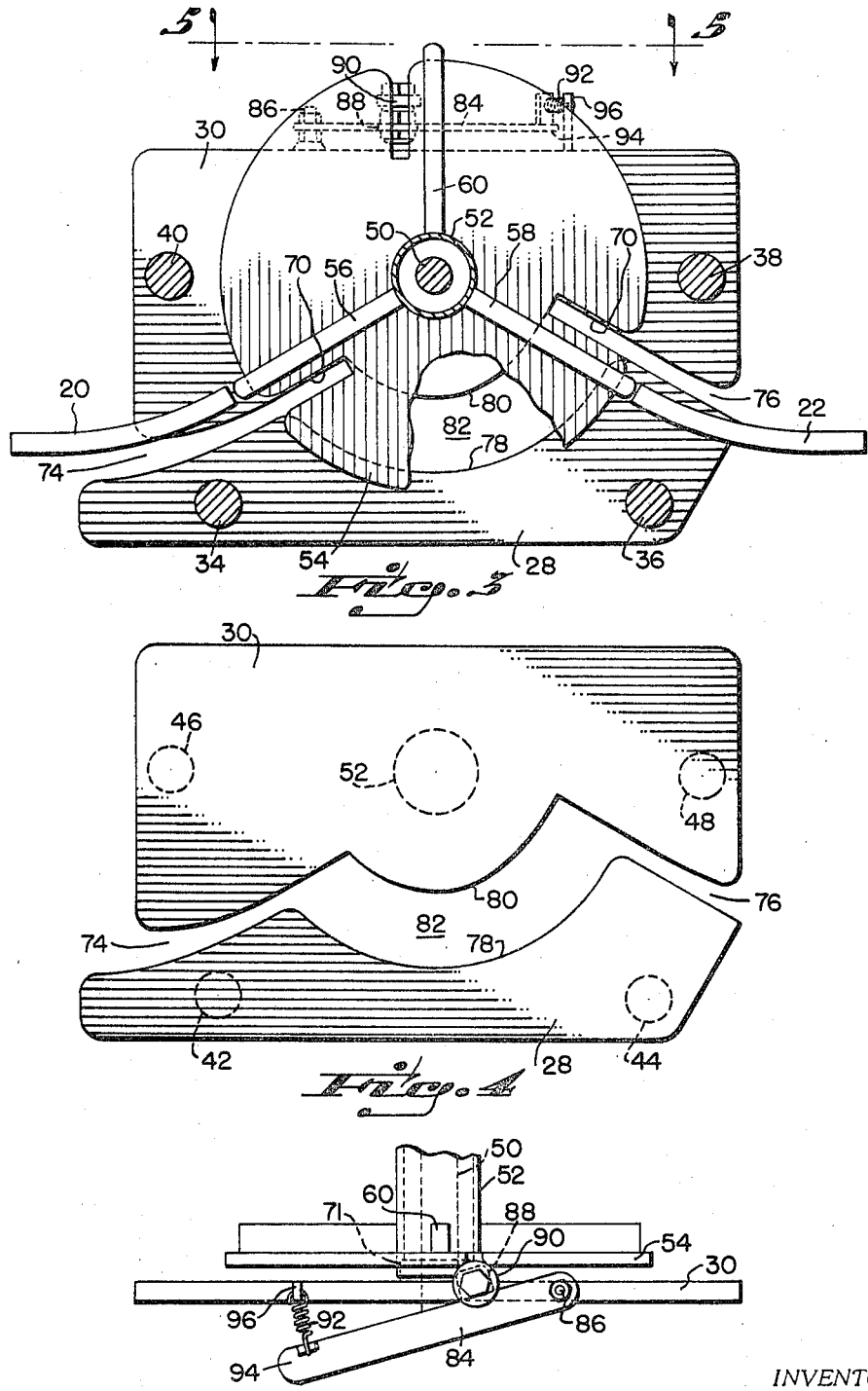

3,422,769
TROLLEY TURN-AROUND
Fred I. Sims, San Francisco, Calif., assignor to The Cincinnati Butchers' Supply Company, Cincinnati, Ohio, a corporation of Ohio
Filed Sept. 22, 1966, Ser. No. 581,254
U.S. Cl. 104—99        22 Claims
Int. Cl. B61j 1/06

ABSTRACT OF THE DISCLOSURE

The trolley turn-around device is mounted between the ends of two spaced stationary trolley rails. A frame carries a rotor which has mounted thereon three trolley rail sections equally spaced apart radially and extending radially outwardly from the axis of rotation of the rotor. Supporting the frame and carried thereby are two stationary curved rails which are aligned respectively with any two rotor rail sections incident to a one-third rotation of the rotor. The outer ends of the curved rails are aligned respectively with the two spaced stationary trolley rails.

---

This invention relates to a trolley turn-around device to be incorporated as a unit in an overhead conveyor system.

In packing and processing plants it is not uncommon to have in-line overhead rails wherein certain sections of the rails are suspended from and supported by hangers disposed on one side of the rails and with hangers for adjacent sections of the rail disposed on the other or opposite side of the rail. Whenever a trolley which rides upon such hanger-suspended rails passes from a rail section suspended from one side to a rail section suspended from the other side it becomes necessary to turn the trolley by 180° in order to preclude interference between the rail hangers and the hanger of the trolley, it being understood that the trolley hanger should always be on that side of a rail which is opposite, remote or away from the rail hanger.

An object of the present invention is to provide a simple, compact, durable, safe, foolproof trolley turn-around which may be interposed between the adjacent spaced ends of adjoining rail sections whose hangers are on opposite sides, whereby it is convenient and feasible to continue the forward motion of a trolley, and its load, in either direction along such rails whether they are suspended from one side or the other, by turning the trolley as it passes from one such rail section to another.

A further object of the invention is to provide a trolley turn-around having the hereinabove described characteristics and which includes rail sections which are adapted to be secured to and carried by the adjacent, spaced ends of hanger-supported rails thereby completely eliminating the need for separate or additional hangers for the turn-around.

Another object of the invention is to provide a trolley turn-around device which includes a turn table or rotor having three loading spokes or rail sections disposed at 120° to each other, and means for securely though releasably locking two of said spokes or rail sections in trolley-receiving relationship with the hanger supported rail sections during those periods of time when the turnaround is not being activated for transferring a trolley from one rail section to the other.

The device in one of its applications, can be used in a meat processing plant, wherein carcasses are carried continuously through the plant on trolleys which ride on overhead rails, with the carcasses impaled upon hooks depending from the trolleys.

At certain locations in a conveyor line, it is found advantageous to rotate the suspended carcasses 180 degrees about a vertical axis, without materially interfering with the continuity of conveyor advancement. Such rotating of the carcasses heretofore had been performed with considerable effort, usually by hand, while the conveyor trolley remained in position upon the conveyor rail. The procedure was laborious and time-consuming, and depended for its successful operation, upon the care or skill that an attendant might exercise in attempting to attain the 180 degree rotation desired, of a long succession of carcasses on trolleys.

An object of the present invention is to provide a highly dependable apparatus, for accurately rotating moving carcasses in succession, through a turn of 180 degrees, or other desired amount, on a vertical axis.

Another object of the invention is to provide an inexpensive, easily installed turn-around device for trolleys and suspended carcasses, which device is in unit form and readily applicable to new or existing conveyor rail installations.

A further object is to provide a device of the character stated, which is simple and easy to operate, and requires a minimum of maintenance or servicing attention.

Another object is to provide a device of the type mentioned, which is compact, durable, and safe to use in controlling and directing even the heaviest of animal carcasses.

The foregoing and other objects are attained by the means described herein, and illustrated upon the accompanying drawings, in which:

FIG. 1 is a front perspective view of the trolley turnaround device embodying the present invention, the device being shown connected in a standard conveyor or rail system, and supporting a conventional trolley for turning.

FIG. 2 is a front elevational view of the device, omitting the trolley and supportive conveyor rail sections.

FIG. 3 is a cross-sectional view taken on line 3—3 of FIG. 2, part being broken away.

FIG. 4 is a detail plan view of a pair of bottom plates used in the turn-around structure.

FIG. 5 is a fragmental rear elevation taken on line 5—5 of FIG. 3, detailing a turntable stop mechanism.

With reference to FIG. 1, the numeral 8 indicates an overhead beam or other support from which depend the rigid hangers 10, 10, each of which hangers suspends a section of conveyor rail in a meat processing plant. Rail sections are indicated at 12 and 14, and the ends thereof are bolted at 16 and 18 to the lower ends of the hangers. As is usual, a series of trolleys may travel in succession upon the rail sections, usually in one direction, for example from left to right in FIG. 1. The space between the bolted end of rail section 12, and the bolted end of rail section 14, is occupied by the trolley turn-around device of the present invention, said device having short rail sections 20 and 22 similarly bolted as at 24 and 26, to the hangers.

The turn-around device is a unitary structure to be interposed between the ends of existing rail sections 12 and 14, which constitute elements of a conventional conveyor system in a meat packing or processing plant. The unit may be supported solely by means of the bolts 24 and 26, as shown.

The turn-around unit may comprise a bottom constituted of two coplanar heavy plates 28 and 30 rigidly related one to the other in a manner to be explained; a heavy top plate 32; and a series of parallel upright posts 34, 36, 38 and 40, to maintain the top and bottom plate elements in spaced parallelism. The lower ends of posts 34 and 36 are secured at locations 42 and 44 upon plate element 28, preferably by welding. In similar manner, posts 38 and 40 are secured to plate element 30, at the locations 46 and 48 (see FIGS. 4 and 5). The upper ends of all the posts are welded or otherwise rigidly secured to the lower face of top plate 32. In this manner, the plates and posts form a rigid unitary frame or cage, with the bottom plates 28 and 30 supported in the spaced relationship depicted by FIG. 4.

A vertical shaft 50, having its ends supported by top plate 32 and bottom plate 30, rotationally supports a vertical tube 52 upon which is fixedly mounted a horizontal turn-table or rotor 54. The upper face of the turn-table carries three short rail sections 56, 58, 60, spaced at 120 degrees about the central tube 52, these rail sections being welded or otherwise rigidly fixed to the tube and to the turn-table. The stationary rail sections 20 and 22 are so arranged as to align with any two of the turn-table rail sections, upon each 120-degree rotation of the turn-table, according to FIGS. 1 and 3. Since the upper edges of all the rail sections are on a common level, a trolley 62 may may travel over rails 12 and 20, and onto rail 56 according to FIG. 1. Then by rotating the rotor or turntable 54 in counter-clockwise direction through 120 degrees, rail 56 will align with rail 22, thereby to permit advancement of the trolley onto rails 22 and 14. In the process, the trolley will be turned 180 degrees so as to impart a half-rotation to the carcass or load suspended by the hook 64 of the trolley, this being the primary function of the apparatus disclosed.

Trolley 62 may be of conventional construction, to include the hook-support leg or hanger 66, and a trolley wheel 68. The turn-table tube or sleeve 52 may be equipped with suitable anti-friction bearings 70, 70, to ensure easy rotation of the turn-table.

The turn-table or rotor 54 is provided with radial slots 72 located one alongside of each turn-table rail, to loosely accommodate the depending leg 66 of the trolley. The three slots are shown upon FIG. 3, in association with the rail sections 56, 58 and 60. The slots 70 preferably terminate at a distance from tube 52, and may be rounded off at their outer ends to facilitate entry of the trolley leg.

With reference to FIGS. 3 and 4, it is noted that the coplanar bottom plates 28 and 30 are spaced from one another from end to end, so as to provide passageways 74 and 76 which extend inwardly toward rotor tube 52. The passageways accommodate loosely the trolley leg 66, as do the rotor slots 70. At the inner termini of passageways 74 and 76, the plates are arcuately cut away at their edges 78 and 80, to provide a widened intermediate passageway 82.

The passageway 82 is of a width slightly greater than the width of trolley leg 66, so as to guide the trolley from passageway 74 to passageway 76, with the trolley leg disposed transversely of passageway 82 while the rotor or turn-table rotates 120 degrees. As the turn-table rotates, trolley wheel 68 remains poised on rail 56, and may not roll thereon due to the restraint imposed upon trolley leg 66 by the edges 78 and 80 of plates 28 and 30.

When the trolley leg reaches passageway 76, the leg may travel outwardly through passageway 76, causing the trolley wheel to advance onto the stationary rail sections 22 and 14, thereby to effect the desired trolley turn-around.

As previously stated, bottom plates 28 and 30 are held in coplanar spaced relationship by reason of their rigid connection with top plate 32, through the agency of upright posts 34, 36, 38 and 40. The trolley-guiding passageways 74 and 76 are disposed directly under the slots 70 of the turn-table, whenever two of the turn-table rails are aligned with the stationary rails 20 and 22. Rails 20 and 22 are welded or otherwise fixedly secured upon plates 30 and 28, respectively, and may provide the sole support for the apparatus between rail hangers 10, 10.

Suitable means may be provided for temporarily latching the turn-table in position to align the turn-table rails with the stationary rails 20 and 22. Such means, in one form, is illustrated by FIG. 5 wherein 84 indicates a lever pivoted at 86 upon the stationary bottom plate 30 and carries an upstanding lug 88 upon which is mounted a roller 90. Roller 90 may dip into any one of the turn-table slots 70, where it is yieldingly held by means of a spring 92 tensioned between the free end 94 of lever 84, and an anchorage 96 on plate 30. Roller 90 may be of a proper diameter such that it will leave the slot 70 whenever sufficient force is applied to the turn-table for rotating it relative to plate 30. Such force may be a manual force applied by an attendant, to the load or carcass suspended from trolley hook 64.

If desired, roller 90 may be withdrawn from slot 70 with the aid of a pull-chain or rope secured to the free end of lever 84, to release the turn-table for rotation. However, it is preferable to utilize a spring 92 of limited power, and a roller 90 of sufficient diameter, to ensure that the roller will release the turn-table automatically as an attendant pushes the carcass in proper direction and with sufficient force to initiate rotation of the turn-table.

The lock or latch means for the turn-table as shown, is exemplary only and is subject to considerable modification. As is evident, any one of the turn-table slots may come into play as an element of the latch means, for accurately aligning the remaining slots 70 with the passageways 74 and 76 of the bottom plate structure, and for aligning the turn-table rails with the stationary rails 20 and 22.

What is claimed is:

1. A trolley turn-around device for interposition between adjacent ends of two spaced stationary trolley rails horizontally disposed, said device comprising in combination: a rigid frame including curved rail means for mounting said frame upon the ends of said stationary trolley rails; a rotor supported by said frame for rotation about a vertical axis; three trolley rail sections equally spaced apart radially upon said rotor and extending substantially radially outwardly from said axis of rotation, said frame-mounting rail means being two in number, each curved rail being angled toward the rotor axis so as to align with any two of the rotor rail sections incident to a one-third rotation of the rotor, and means to preclude shifting of a tractional trolley lengthwise along the rail sections of the rotor during partial rotation of the rotor relative to said frame.

2. The device as specified by claim 1, wherein the frame includes a two bottom plate structure, the parts of which are spaced from one another to provide passageways, constituting the means last mentioned.

3. The device as specified by claim 1, wherein the combination includes: a releasable latch means operative to latch the rotor in positions at which the rail sections of the rotor align with the rail means which mount the frame upon the ends of the stationary trolley rails.

4. The device as specified by claim 2, wherein the combination includes a rigid top plate; rigid means for suspending one part of the bottom plate structure from said top plate; and a second rigid means for separately suspending the remaining part of the bottom plate structure from said top plate.

5. The device as specified by claim 4, wherein the combination includes: a latch means operative to releasably latch the rotor in positions at which the rail sections of the rotor align with the rail means which mount the frame upon the ends of the stationary trolley rails.

6. The device as specified by claim 5, wherein the frame includes a two bottom plate structure, the parts of which are spaced from one another to provide passageways constituting the means to preclude shifting of the trolley lengthwise along the rail sections of the rotor.

7. The device as specified by claim 6, wherein the combination includes: a latch means operative to releasably latch the rotor in positions at which the rail sections of the rotor align with the rail means which mount the frame upon the ends of the stationary trolley rails.

8. A turn-around device for a conveyor trolley having a rail-supported wheel, a leg depending from said wheel, and a load-carrying element depending from said leg; said device comprising in combination: a rigid top member; a pair of rigid bottom members plate-like in form; and a rotor disposed intermediate said top and bottom members for rotation in substantial parallelism with one of said bottom members upon a vertical axis; means rigidly suspending said one bottom member from said top member; other means rigidly and separately suspending the other bottom member from the top member, with said bottom members spaced apart to provide there between an entry passageway and an exit passageway to accommodate the thickness of the trolley leg; an intermediate passageway communicating with the entry and exit passageways, said intermediate passageway being in width slightly greater than the width of the trolley leg; a plurality of trolley rail sections upstanding upon the rotor and fixed thereto, said rail sections being disposed substantially radially of the axis of rotation of the rotor, and being equally spaced from one another, said rail sections having outer ends remote from said axis; a fixed trolley rail section mounted upon one bottom member; a fixed trolley rail section mounted upon the other bottom member; said fixed trolley rail sections having ends directed substantially radially toward the rotor axis, with the distance between said ends approximately equal to the distance between the outer ends of successive rotor rail sections, whereby upon predetermined rotation of the rotor the ends of the rotor rail sections align with the ends of the fixed trolley rail sections, for transfer of trolleys to and from the fixed trolley rail sections and the rail sections of the rotor.

9. The device as specified by claim 8, wherein the rail sections of the rotor are three in number, and are spaced apart 120 degrees.

10. The device as specified by claim 9, wherein the intermediate passageway is arcuate, and concentric with the axis of rotation of the rotor.

11. The device as specified by claim 8, wherein the fixed rail sections of the bottom members have outer ends including means for attaching said ends to a main trolley rail.

12. The device as specified by claim 8, wherein the rotor is in the form of a turn-table disc slotted inwardly in substantial parallelism with the rail sections of the rotor, said slots accommodating the depending legs of trolleys supported upon the rotor rail sections.

13. The device as specified by claim 12, wherein the combination includes: a latch means operative to releasably latch the rotor in positions at which the rail sections of the rotor align with the fixed rail sections of the bottom members aforesaid.

14. The device as specified by claim 8, wherein the combination includes: a latch means operative to releasably latch the rotor in positions at which the rail sections of the rotor align with the fixed rail sections of the bottom members aforesaid.

15. The device as specified by claim 12, wherein the slots of the turn-table disc overlie the entry and exit passageways of the bottom members, when the rail sections of the rotor align with the fixed rail sections of said bottom members.

16. The device as specified by claim 15, wherein is included latch means releasably maintaining the alignment of the rail sections as stated.

17. The device as specified by claim 16, wherein the fixed rail sections of the bottom members have outer ends including means for securing said ends to a main trolley rail.

18. The device as specified by claim 8, wherein the fixed trolley rail sections are mounted upon the bottom members along lines adjacent and substantially parallel to the entry and exit passageways of said bottom members.

19. A turn-around device for a conveyor trolley having a rail-supported wheel, and a load-suspension leg depending from said wheel, said device comprising: a turn-table carrying a plurality of radially disposed trolley rail sections for support of conveyor trolleys, said rail sections being at least two in number and spaced from one another at 120 degrees angularity; and two stationary trolley rail means, said stationary rail means having their outer end portions in longitudinal alignment and their mid portions curved to bring the inner end portions in alignment with the outer ends of the respective rail sections for directing trolleys onto said rail sections, and off of said rail sections of the turn-table, incident to a one-third rotation of the turn-table.

20. The device as specified by claim 19, wherein is included means to preclude shifting of the trolley lengthwise of the turn-table rail sections, during rotation of the turn-table.

21. The device as specified by claim 20, wherein the stationary trolley rail means includes means for supporting the device bodily between spaced ends of an interrupted main trolley conveyor rail.

22. The device as specified by claim 21, wherein is included means for releasably latching the turn-table at each one-third rotation thereof.

References Cited

UNITED STATES PATENTS

| | | | |
|---|---|---|---|
| 1,018,407 | 2/1912 | Cameron | 104—99 |
| 1,632,558 | 6/1927 | Moon | 104—99 |
| 1,684,986 | 9/1928 | Gillies | 104—99 |
| 2,222,356 | 11/1940 | Nelles | 104—103 |

ARTHUR L. LA POINT, *Primary Examiner.*

CHARLES B. LYON, *Assistant Examiner.*